Figure 1:
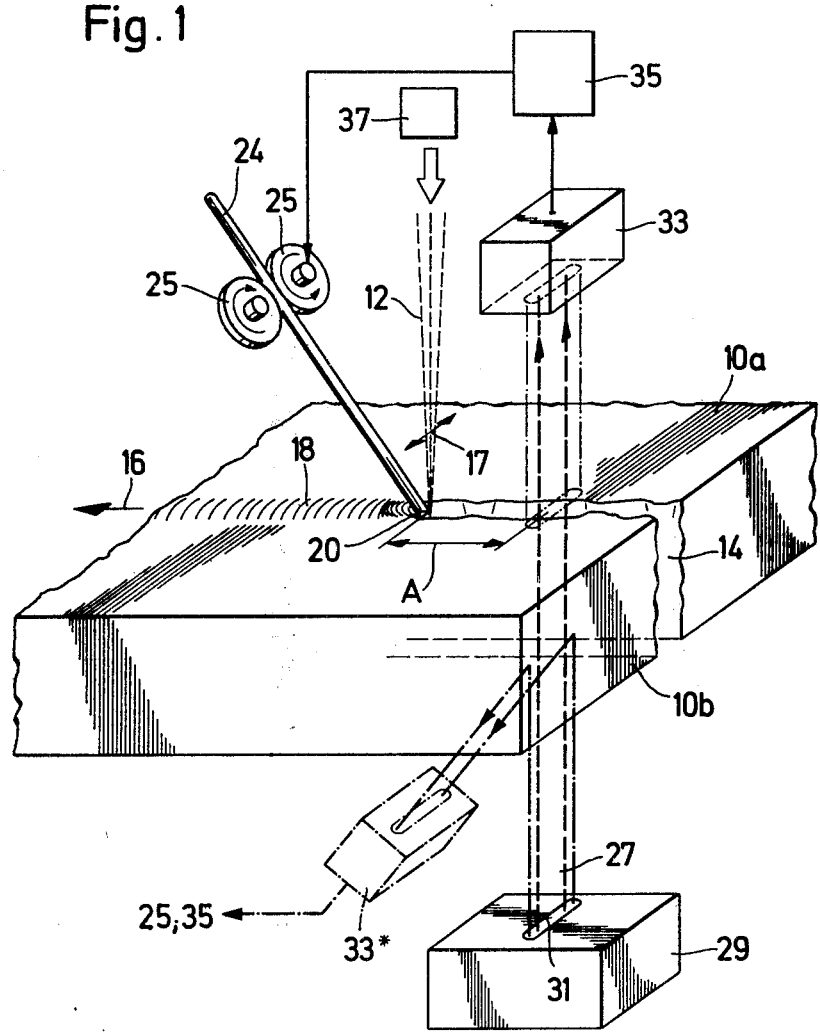

United States Patent [19]

Anderl et al.

[11] 4,203,021
[45] May 13, 1980

[54] METHOD AND APPARATUS FOR CONTROL OF METHOD PARAMETERS IN ENERGY BEAM WELDING

[75] Inventors: Peter Anderl, Munich; Wilhelm Scheffels, Puchheim; Karl H. Steigerwald, Starnberg; Clauspeter Mönch, Grafrath; Johannes Koy, Germering; Dieter König, Munich, all of Fed. Rep. of Germany

[73] Assignee: Steigerwald Strahltechnik GmbH, Munich, Fed. Rep. of Germany

[21] Appl. No.: 820,331

[22] Filed: Jul. 29, 1977

[30] Foreign Application Priority Data

Jul. 30, 1976 [DE] Fed. Rep. of Germany ....... 2634341
Jul. 30, 1976 [DE] Fed. Rep. of Germany ....... 2634342

[51] Int. Cl.² ............................................. B23K 9/00
[52] U.S. Cl. ...................... 219/121 EB; 219/121 EM
[58] Field of Search ................. 219/121 EB, 121 EM, 219/137.71

[56] References Cited

U.S. PATENT DOCUMENTS

| 3,165,619 | 1/1965 | Cohen | 219/121 R |
| 3,612,818 | 10/1971 | Beehtle | 219/137.71 |
| 3,743,776 | 7/1973 | Corcelle | 219/121 EB |
| 3,766,355 | 10/1973 | Weserstrasse | 219/121 EB |
| 3,855,446 | 12/1974 | Kotova | 219/137.71 X |

*Primary Examiner*—J. V. Truhe
*Assistant Examiner*—Fred E. Bell
*Attorney, Agent, or Firm*—Brumbaugh, Graves, Donohue & Raymond

[57] ABSTRACT

A method and an apparatus for the control of the filler material supply rate in energy beam welding as electron beam welding is disclosed. The width or cross-sectional area of a gap defined by opposed faces of two workpiece parts to be joined is measured by radiation, preferably X-ray radiation, and the rate with which filler material is supplied into a welding zone produced by the energy beam is controlled in proportion to the result of the measurement. The measurement may be made in advance of the welding zone and the control is then delayed by a period of time, which the welding zone takes to arrive at the position of the gap, where the measurement was made.

30 Claims, 3 Drawing Figures

METHOD AND APPARATUS FOR CONTROL OF METHOD PARAMETERS IN ENERGY BEAM WELDING

The present invention relates to a method and apparatus for the control of method parameters, more particularly the quantity of added material introduced per unit time into a welding zone and/or of the beam power in the case of welding two workpieces, which are separated by a joint gap, whose cross-section changes along its length, by means of an energy beam, for example by means of an electron beam.

In particular the invention relates to the energy beam or electron beam welding of large and thick workpieces, that is to say workpieces whose thickness amounts to more than 5 mm and more specifically more than 10 or 20 or even more than 30 or 50 mm.

In the case of welding together large and thick workpiece parts, for example the edges of large pieces of steel sheet the breadth of the butt joint or separating gap can vary between 0 and for example 3 mm or more, since small tolerances in the case of large workpieces can only be ensured with disproportionally involved manufacturing methods. In order to fill the separating gap it is therefore necessary as a rule to introduce additional or filling material into the weld zone. The introduction of additional material can furthermore be called for for metallurgical reasons.

The U.S. Pat. No. 3,165,619 (corresponding to the German specification No. 1,270,708) refers to an electron beam welding method in the case of which the separating gap before it is closed ahead of the weld zone is sensed by means of a forwardly tapering feeling pin, the breadth of the separating gap is measured on the basis of the greater or lesser penetration of the tapering tip of the feeling pin at the position sensed and the results of measurement are used for controlling the supply speed for a filler wire to the welding zone.

The above mentioned previously proposed method has the disadvantage that mechanical sensing is complicated and is liable to breakdown and in many cases, for example with workpiece edges which have a vertical offset, inaccurate results are produced.

One aim of the present invention is that of providing a method of the initially mentioned type which avoids these disadvantages.

This is achieved by a method for seam welding using an energy beam, preferably an electron beam, in the case of which the breadth of a separating gap to be closed by welding is measured and the supply of additional material is controlled in accordance with the result of measurement, in accordance with the invention in that the breadth of the separating gap is measured by means of radiation, which pervades at least a part of the still open seam gap short of the welding zone in the direction of welding and is influenced in accordance with the cross-section of the separating gap.

The radiation can be corpuscular radiation such as molecular, atomic, ionic or electron radiation and for example be produced by the welding energy beam, though preferably however use is made of electro-magnetic radiation and in particular X-rays. The electromagnetic radiation can also be produced by the welding energy beam. In the case of electron beam welding preferably use is made of X-rays, which are produced by the electron beam in the welding zone or at a target or an X-ray anode, which with respect to the beam gun supplying the electron beam lies behind the workpiece parts to be welded and is struck by the electron beam, after the latter has pervaded the weld zone and has emerged from the latter again at the rear.

If as a measuring radiation use is made of radiation which the energy beam produces itself in the welding zone, the radiation detector is preferably so arranged that the walls, delimiting the separating gap, of the workpiece parts to be welded act as a diaphragm or aperture and delimit the aperture angle, covered by the radiation detector, of the radiation in a direction perpendicular to the separating gap.

An apparatus in accordance with the present invention comprises a radiation detector, which with respect to a separating gap to be closed by welding and to a radiation source is so arranged that it detects radiation, which comprises information as regards the breadth or the cross-section of the separating gap and supplies an output signal comprising this information; further the device comprises a device controlled by the output signal of the radiation detector for controlling the speed with which a filling material is introduced into the weld zone.

In what follows embodiments of the invention will be described in detail with reference to the drawings. In this respect further aspects features and advantages of the invention will be discussed.

Figure 2:
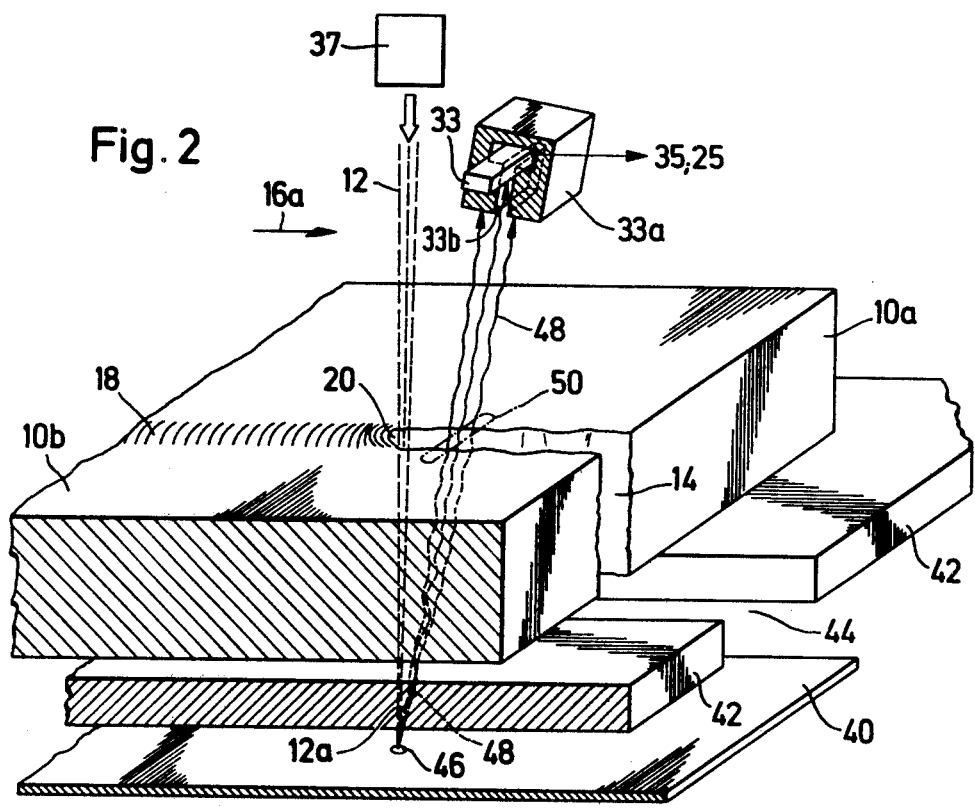
Figure 3:
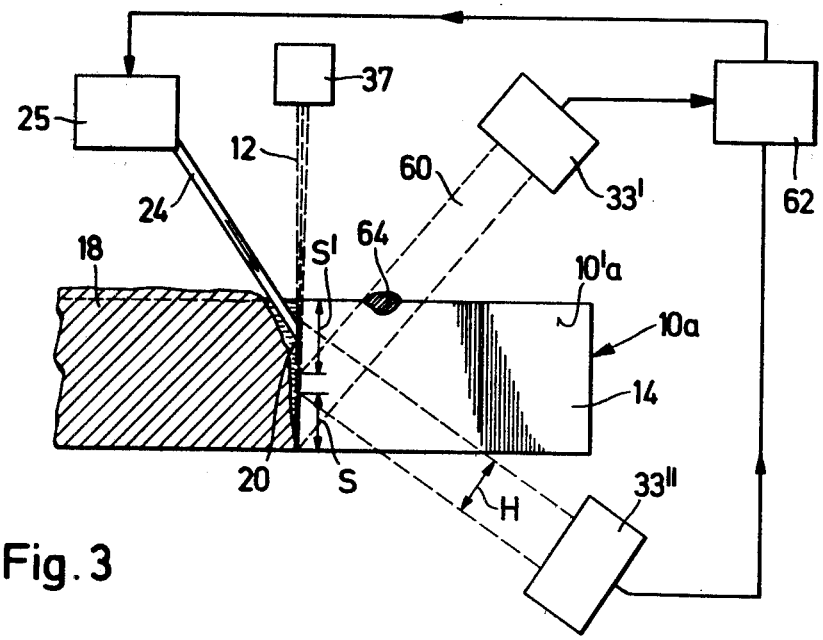

FIGS. 1 and 2 and 3 of the accompanying drawings respectively show a device for energy beam welding in accordance with one embodiment of the invention.

The invention will be explained in what follows with reference to the example of an electron beam welding operation but however it can naturally be used in a similar manner in the case of ion beam welding and, in as far as no X-rays are employed, it can also be used for laser beam welding.

The invention will be described in what follows with reference to electron beam welding. Electron beam welding machines have already been proposed, see for example the U.S. Pat. No. 2,987,610 so that the details of the welding machine itself, the vacuum chamber, the workpiece transport means and the like are not represented. In the figures like parts are denoted by like references.

FIG. 1 diagrammatically shows the welding of two workpiece parts 10a and 10b represented as thick plates by means of an electron beam 12, which is generated in a conventional manner and is focussed on a separating gap 14 which is to be filled by welding between the two workpiece parts. The workpiece parts 10a and 10b are moved in a manner not especially shown in the direction of an arrow 16 in relation to the electron beam 12. Short of the electron beam 12 (to the right in the terms of the drawing) the separating gap 14 is still open. In the welding zone, that is to say in the zone in which the electron beam acts, which is preferably oscillated or reciprocated transversely with respect to the longitudinal direction of the separating gap (see double arrow 17) the separating gap is filled with molten material and following the molten material behind the beam the workpiece parts are already connected by a weld seam or weldment 18. For filling the separating gap 14 in the weld zone 20 use is made of added material, for example of a filling wire 24, which is introduced into the gap.

The cross-section of the separating gap 14 is determined at a predetermined distance A short of the welding zone 20 and the speed of advance of the filling wire is controlled to be at least approximately proportional to the cross-sectional area determined. One can also keep constant the supply speed for the filling wire and control the relative speed between the workpiece parts and the electron beam so as to be inversely proportional to the cross-sectional area as determined.

The control of the supply speed of the additional material can be delayed in order to compensate for the distance A between the position of measurement and the welding zone.

In the case of the embodiment of FIG. 1 the cross-sectional area of the separating gap is measured by means of a ribbon-like gamma ray bundle 27, which is produced for example by means of a radioactive isotope, which is located in a screen container 29 with a slot-like exit opening 31. The source of gamma radiation is arranged on the one side of the workpiece parts and the intensity of the gamma beam is measured on the other side by means of a detector 33, for example in the form of a counter-tube or the like. As a first approximation it is proportional to the cross-sectional area if the thickness of the workpiece parts in the advanced direction 16 is substantially constant.

Instead of the gamma radiation source it is also possible to use a source of electro-magnetic radiation with a longer wavelength, such as optic radiation or a source of corpuscular radiation, as was mentioned supra. Naturally in such cases use must be made of a radiation detector, which responds to the radiation employed.

The signal, proportional to the cross-sectional area, from the detector 33 is delayed in a delay device 35 as required by the cross-sectional zone measured in order to come into the field of influence of the electron beam 12, that is to say it is delayed by a time corresponding to the time required for passing along the distance A. The delayed signal then controls the advancing device 25 in a manner whose principles are well understood.

In the case of the embodiment of FIG. 2 the cross-sectional area is determined with the help of X-ray radiation, which is produced in an advantageous and convenient manner by the electron beam 12 itself which is employed for welding and produced by an electron gun 37 of known type. In the case of seam welding by means of an electron beam this beam is, as is well known, generally not completely absorbed in the workpiece parts and a part of the beam emerges at the rear side of the welding zone. In the path of this emergent residual beam 12a a body 40 is arranged, which when subject to the impingement of high energy electrons emits X-rays. The body 40 can for example consist of a tungsten sheet strip and extend over the whole length of the separating gap 14 or it can consist of a relatively small body of tungsten or the like and be fixed with respect to the electron beam 12. In the case of the embodiment of FIG. 2 it is assumed that the workpiece parts 10a and 10b are held on a stationary carriage 42, which has a slot 44, through which the electron beam can pass. Behind the separating gap 14 and the slot 44 the body 40 in the form of a tungsten sheet strip is so arranged that it has the emergent part 12a of the electron beam 12 impinging on it, which during the course of welding is passed along the separating gag 14 in the direction of the arrow 16a.

The X-ray radiation 48 produced as an impingement spot 46 on the surface of the body 40 pervades the separating gap 14 and is detected by an X-ray detector 33, which is accommodated in a screening housing 33a, which has a slot-shaped radiation entry opening 33b acting as a collimator and which limits the "field of view" of the detector 33 in a slot-shaped zone 50, which extends transversely over the separating gap 14. The mean temporal intensity of the X-ray radiation detected by the detector 33 is therefore again substantially proportional to the breadth of the separating gap 14 and the output signal of the detector 33 can therefore, as is the case with the device of FIG. 1, be employed for controlling the supply of additional material, something which is not shown in FIG. 2 in order to simplify the drawing.

In the case of the embodiment of FIG. 3 for measuring the breadth of the separating gap 14, shown here in cross-section, radiation is employed, which is produced by the energy beam, for example the electron beam 12 in the welding zone 20. As radiation preferably use is made of X-ray radiation though however it is also possible to use scattered electrons, optic radiation or neutral particle radiation (vapor molecules or atoms, whose mean free path on welding in vacuo is generally sufficiently large in order to be able to regard them as "radiation"). The radiation produced by the welding zone 20 within the separating gap 14 is detected by a radiation detector 33', which, as is shown in FIG. 3, is so arranged and constructed that it only detects radiation which originates from the interior of the separating gap 14. This radiation is delimited by the frontal surfaces, delimiting the separating gap 14, of the workpiece parts, of which in FIG. 3 only the frontal surface 10's of the workpiece part 10a is to be seen. The breadth, reckoned perpendicularly to the plane of the drawing, of the radiation bundle 60 and its mean intensity respectively is therefore a degree for the breadth of the separating gap 14.

The measurement can also be carried out by means of a radiation detector 33" which, as is shown in FIG. 3, is arranged beneath the workpiece parts and also detects radiation, more particularly X-ray radiation, which emerges from the welding zone 20 in the interior of the separating gap 14 and is delimited by the mutually opposite frontal walls, delimiting the separating gap 14, of the workpiece parts.

It is even possible to make use of two radiation detectors 33' and 33". The output signals of the two detectors 33' and 33" are supplied to a signal processing circuit 62, which either selects the larger of the two signals and supplies it to the device 25 for controlling the advance speed of the filling wire 24 or forms a means value from the detector output signals and supplies this means value to the advance control device 25. The use of the larger of the two detector output signals offers the advantage that a proper filling of the separating gap is ensured even in cases in which the breadth of the separating gap changes in the direction of the electron beam 12 or if the two workpiece parts are connected together by small tacking welds 64, which in the case of the devices of FIGS. 1 and 2 would cause the system to react as if a gap of zero breadth were present. In the case of FIG. 3 it is advantageous also to use detectors with means limiting the field of view such as collimators, which delimit the field of view in the vertical direction of the separating gap 14 to a comparatively large height H so that a comparatively large height range of the separating gap is covered and irregularities, such as tacking welds 64 do not have any excessive effect. The range of coverage in accordance with the height H in the case preferably only begins at a certain distance S or S' respectively beneath the surface, adjacent to the respective detector, of the workpiece parts so that a limitation of the radiation bundle by the frontal surfaces of the workpiece parts is ensured. The radiation detectors 33' and 33" can only have a slot-shaped field of view of a small height H as along the lines shown in FIG. 2 at 50.

When the energy beam 12 is oscillated in the transverse direction of the separating gap 14 the radiation detectors used in the embodiments of FIGS. 2 and 3 will provide output signals in the form of pulses, whose breadth is a measure of the breadth of the separating gap 14. The pulses are then preferably limited so that intensity variations in the radiation source remain without any effect and then a control signal, proportional to the breadth of the pulses, will be obtained for the device advancing the filling wire, for example by integration of the pulses which have been limited and re-shaped to form rectangular or square pulses.

In the case of the above embodiments that part of the measuring radiation is used, which is allowed to pass by the separating gap. In many cases however the converse procedure can be adopted: for example in the case of the device of FIG. 1 the stray radiation or photo-electrons can be measured, which are produced by the narrow gamma radiation bundle at the impingement surface zones of the workpiece parts. The detector will then be arranged on the same side as the radiation source, as is indicated in FIG. 1 at 33. The detector then provides an output signal which is smaller when the separating gap is broader, that is to say the output signal varies inversely with the width of the gap.

In a corresponding manner the embodiment in accordance with FIG. 2 can also be modified by orientating the detector 33 in such a manner that the zone 50 to which it responds substantially coincides with the zone impinged upon by the oscillating electron beam 12. As a general rule the emission of X-ray radiation or stray electrons at the surface of the workpiece parts 10a and 10b is greater than in the vicinity of the joint gap 14 and the output signal of the detector 33 then comprises a minimum corresponding to the joint gap, and the breadth of it can be used as a measurement for the breadth of the joint gap 14.

The minimum of the detector output signal can be converted into a maximum by an inverting stage and can then be further processed in the manner described.

We claim:

1. A method for seam welding a workpiece by means of an energy beam in the case of which the breadth of a separating gap to be closed by welding is measured and the supply of filling material is controlled in accordance with the result of measurement characterized in that the breadth of the joint gap is measured by means of X-ray radiation, which is influenced by the workpiece parts delimiting the joint gap in accordance with the breadth of the latter.

2. A method in accordance with claim 1, characterized in that as an energy beam use is made of an electron beam.

3. A method in accordance with claim 1 characterized in that the cross-section of a bundle of the X-ray radiation is delimited by the workpiece parts delimiting the separating gap and the intensity of the delimited radiation bundle is measured.

4. A method in accordance with claim 2 wherein the electron beam is not completely absorbed by the welding zone and re-emerges in part from the side remote from the beam source characterized in that in the path of the emergent part of the beam, a body is arranged which when impinged upon by the electron beam emits X-rays and in that the X-ray radiation is measured after it has pervaded the separating gap.

5. A method in accordance with claim 1, characterized in that radiation originating from the surface of the workpiece parts is excluded from the measurement.

6. A method in accordance with claim 1 characterized in that the measurement is carried out using radiation which originates from the workpiece parts delimiting the joint gap.

7. A method in accordance with claim 6 characterized in that for measurement use is made of radiation which is dispersed by the workpiece parts delimiting the joint gap.

8. A method in accordance with claim 6 characterized in that the energy beam is moved backwards and forwards transversely with respect to the joint gap and in that for measurement radiation is produced which is created on impingement of the energy beam on the workpiece parts delimiting the joint gap, while the energy beam in the vicinity of the joint gap produces the radiation to a lesser extent or does not produce it at all.

9. A method in accordance with claim 8 characterized in that the breadth of the joint gap is determined on the basis of a minimum of a detector output signal.

10. A method in accordance with claim 1 characterized in that for measurement radiation is employed which passes through a narrow measuring zone running perpendicularly with respect to the joint gap.

11. An apparatus for seam welding by means of an energy beam, comprising a device for producing and directing the energy beam onto a welding zone in a separating gap between two workpiece parts to be welded together, an advancing device for producing a relative movement between the workpiece parts and the energy beam, a device for determining the breadth of the separating gap and a device, controlled by the last mentioned device, for introducing additional material into a welding zone on which the energy beam impinges in the separating gap characterized in that the device for determining the breadth of the separating gap comprises at least one X-ray radiation detector, which responds X-ray to radiation, which has pervaded at least a part of the separating gap and has been influenced in accordance with the breadth of the separating gap.

12. An apparatus in accordance with claim 11 with a device for producing a charged particle or charge carrier beam characterized in that on the side, remote from the device for producing the charged particle beam, of the workpiece parts in the path of the charged particle beam emerging from the welding zone a body is arranged which on impingement by the charged particle beam emits X-rays and in that an X-ray radiation detector is so arranged on the side, adjacent to the device for producing the charged particle beam, of the workpiece parts that it detects X-ray radiation emerging from the body after such radiation has passed through the separating gap between the workpiece parts.

13. An apparatus in accordance with claim 15 characterized by a primary radiation source, which directs a primary radiation pencil on a part of the separating gap which as considered in the direction of the relative movement lies short of the weld zone, and by a radiation detector, which responds to secondary radiation, which is produced by the primary radiation at the zones impinged on by it and which are adjacent to the separating gap, of the workpiece parts.

14. An apparatus in accordance with claim 11 in the case of which the energy beam is moved backwards and forwards or oscillated transversely with respect to the separating gap characterized by a radiation detector, which responds to radiation produced by the oscillated energy beam at the zones, impinged on by it, of the workpiece parts, while this radiation is produced by the energy beam in the vicinity of the separating gap to a substantially lesser extent.

15. An apparatus in accordance with claim 14 characterized in that the device for introducing the filler material responds to a signal minimum in the output signal of the radiation detector.

16. An apparatus in accordance with claim 15 characterised by the fact that on each side of the workpiece parts one respective radiation detector is arranged and in that the output signals of the radiation detector are supplied via a signal processing circuit to the device for controlling the supply of the filling material.

17. An apparatus in accordance with claim 16 characterized in that the signal processing circuit selects the larger signal of the two detector output signals.

18. An apparatus in accordance with claim 16 characterized in that the signal processing circuit averages the detector output signals.

19. A method for seam welding a workpiece by means of an energy beam in the case of which the breadth of a separating gap to be closed by welding is measured and the supply of filling material is controlled in accordance with the result of measurement characterized in that the breadth of the gap is measured using radiation generated by interaction between said energy beam and said workpiece, said radiation being delimited by an unwelded portion of said gap.

20. A method as specified in claim 19 wherein said generated radiation comprises X-ray radiation.

21. A method as specified in claim 19 wherein said generated radiation comprises optical radiation.

22. A method as specified in claim 19 wherein said generated radiation comprises particle radiation.

23. A method as specified in claim 1 wherein said X-ray radiation comprises X-ray radiation generated by a separate X-ray radiation source.

24. Apparatus as specified in claim 11 wherein there is provided an X-ray source, separate from said energy beam, for generating X-ray radiation for use in measuring the breadth of said gap.

25. An apparatus for seam welding by means of an energy beam, comprising a device for producing and directing the energy beam onto a welding zone in a separating gap between two workpiece parts to be welded together, an advancing device for producing a relative movement between the workpiece parts and the energy beam, a device for determining the breadth of the separating gap and a device, controlled by the last mentioned device, for introducing additional material into a welding zone on which the energy beam impinges in the separating gap characterized in that the means for determining the breadth of the separating gap comprises a radiation detector responsive to radiation generated in the welding zone by interaction of the energy beam and the workpiece, said detector being arranged to receive said radiation after said radiation has been delimited by said gap.

26. Apparatus as specified in claim 25 wherein said radiation detector is responsive to X-ray radiation generated in said welding zone.

27. Apparatus as specified in claim 25 wherein said radiation detector is responsive to optical radiation generated in said welding zone.

28. Apparatus as specified in claim 25 wherein said radiation detector is responsive to particle radiation generated in said welding zone.

29. A method for seam welding a workpiece by means of an energy beam in the case of which the breadth of a separating gap to be closed by welding is measured and the supply of filling material is controlled in accordance with the result of measurement characterized in that the breadth of the gap is measured by means of gamma-radiation generated by a separate gamma-radiation source, which is influenced by the workpiece parts delimiting the joint gap in accordance with the breadth of the gap.

30. An apparatus for seam welding by means of an energy beam, comprising a device for producing and directing the energy beam onto a welding zone in a separating gap between two workpiece parts to be welded together, and an advancing device for producing a relative movement between the workpiece parts and the energy beam, a device for determining the breadth of the separating gap and a device, controlled by the last-mentioned device, for introducing additional material into the welding zone on which the energy beam impinges in the separating gap, characterized in that the device for determining the breadth of the separating gap comprises a separate gamma-radiation source, at least one gamma-radiation detector, which responds to gamma-radiation from said source which has pervaded at least a part of the separating gap and has been influenced in accordance with the breadth of the separating gap.

* * * * *

UNITED STATES PATENT AND TRADEMARK OFFICE
CERTIFICATE OF CORRECTION

PATENT NO. : 4,203,021

DATED : May 13, 1980

INVENTOR(S) : ANDERL et al.

It is certified that error appears in the above-identified patent and that said Letters Patent are hereby corrected as shown below:

Column 3, line 61, "gag" should read --gap--;

Column 4, line 28, "10's" should read --10'a--;

Column 4, line 47, "means" should read --mean--; and

Column 4, line 48, "means" should read -- mean--;

Column 6, line 4, "claim 1" should read --claim 19--;

Column 6, line 7, "claim 1" should read --claim 19--;

Column 6, line 27, "claim 1" should read -- claim 19--;

Column 6, line 44, "X-ray to" should read --to X-ray--;

Column 6, line 60, "claim 15" should read --claim 11--; and

Column 7, line 14, "claim 15" should read --claim 11--.

Signed and Sealed this

Twelfth Day of August 1980

[SEAL]

Attest:

SIDNEY A. DIAMOND

Attesting Officer

Commissioner of Patents and Trademark